United States Statutory Invention Registration [19]

[11] Reg. Number: H63

Vogel et al. [45] Published: May 6, 1986

[54] POSITIONING APPARATUS

[75] Inventors: Max A. Vogel, Kennewick; Paul Alter, Richland, both of Wash.

[73] Assignee: The United States of America as represented by the United States Department of Energy, Washington, D.C.

[21] Appl. No.: 511,702

[22] Filed: Jul. 7, 1983

[51] Int. Cl.[4] ..... G01N 21/00

[52] U.S. Cl. ..... 250/491.1; 376/192; 376/260

[58] Field of Search ..... 74/479; 250/442.1, 491.1; 376/108, 192, 340, 341

[56] References Cited

U.S. PATENT DOCUMENTS

| | | | |
|---|---|---|---|
| 2,380,209 | 7/1945 | Bachman et al. | |
| 2,499,019 | 2/1950 | Dornfeld . | |
| 2,871,719 | 2/1959 | Hooker . | |
| 3,476,936 | 11/1969 | Mills | 250/442.1 |
| 3,521,056 | 7/1970 | Suzuki . | |
| 3,790,155 | 2/1974 | Longamore . | |
| 3,993,910 | 11/1976 | Parkin et al. | 376/192 |
| 4,033,904 | 7/1977 | Gerlach et al. | 250/442.1 |
| 4,058,731 | 11/1977 | Müller et al. | |
| 4,060,727 | 11/1977 | Verdickt . | |
| 4,171,648 | 10/1979 | Manzoni . | |
| 4,193,317 | 3/1980 | Oono et al. | |
| 4,213,051 | 7/1980 | Struthoff . | |
| 4,229,655 | 10/1980 | Ryding . | |
| 4,229,656 | 10/1980 | Iverson et al. | |

*Primary Examiner*—Deborah L. Kyle
*Assistant Examiner*—Richard W. Wendtland
*Attorney, Agent, or Firm*—Robert Southworth, III; Judson R. Hightower

[57] ABSTRACT

An apparatus for precisely positioning materials test specimens within the optimum neutron flux path emerging from a neutron source located in a housing. The test specimens are retained in a holder mounted on the free end of a support pivotably mounted and suspended from a movable base plate. The support is gravity biased to urge the holder in a direction longitudinally of the flux path against the housing. Means are provided for moving the base plate in two directions to effect movement of the holder in two mutually perpendicular directions normal to the axis of the flux path.

9 Claims, 7 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POSITIONING APPARATUS

BACKGROUND OF THE INVENTION

The present invention relates generally to a positioning apparatus and, more particularly, to an apparatus for positioning materials test specimens in a desired location relative to a neutron flux beam. The United States Government has rights in this invention pursuant to Contract No. DE-AC14-76FF02170 between the U.S. Department of Energy and Westinghouse Electric Corporation.

In support of the development of fusion energy, there is presently being designed an irradiation test facility for the purpose of determining the effect of high energy neutrons on candidate fusion materials. This facility will provide users or experimenters with the capability of irradiating a variety of test specimens at damage rates commensurate with those anticipated in future fusion reactors. This facility utilizes an accelerated deuteron-lithium stripping reaction to generate a high energy neutron source housed in a heavily shielded test cell. Basically, an accelerator deuteron beam is focused onto a flowing liquid lithium target in the form of a jet stream flowing down a curved wall of a chamber. The interaction of the deuterons with the flowing lithium target produces a high energy neutron source which is forwardly biased i.e., emerging from the target in a direction away from but parallel to the deuteron beam direction. The region of highest neutron flux flow and associated neutron damage is located directly behind the lithium target i.e., the side opposite the incoming deuteron beam. It is important to precisely position the fusion materials test specimens in this region adjacent the target for maximum neutron flux exposure.

However, the precise positioning of the test specimens relative to the optimum neutron flux path poses problems since the location of the streams of neutrons in this region is not completely predictable and may change during operation. Other changes in the relative positioning between the test specimens and target can occur as a result of thermal expansion and from dimensional fabrication and/or installation tolerances. Moreover, since the test specimens are located in a radiation shielded test cell and preferably lowered thereinto through plugs in the top wall of the cell, positioning must be performed by remote means. This is further complicated by an outwardly projecting obstruction forming a part of the nozzle through which the lithium stream flows and which is located immediately above the target.

Conventional solutions and apparatus were investigated to overcome the above noted problems but did not prove satisfactory. For example, stacked ball slides were found to be bulky and required complex shafting with gearing arrangements to translate motion. Another apparatus considered was a two-axis "wobble" plate operated by three vertically oriented shafts. This apparatus not only required complex coordinated three rod translation to achieve a Y direction motion for example, but also produced undesirable interaction between motions, and was not able to compensate for operational errors. Still other devices contemplated utilized springs to either bias components or to prevent backlash. The use of springs in an irradiation environment is not desirable because they become embrittled in a neutron flux environment with consequent loss of resiliency.

Accordingly, it is a primary object of the present invention to provide a new and useful positioning apparatus for precisely orienting articles relative to a target zone.

It is another object of this invention to provide a new and useful remotely operated positioning apparatus providing movement in three directions for locating and orienting test specimens within an optimum neutron flux flow path in an irradiation environment.

It is still another object of the present invention to provide retraction of the test article along the beam axis to facilitate installation and removal of the article relative to the neutron source.

It is yet another object of this invention to provide precise independent movement of the test specimens in two directions perpendicular to the neutron beam axis.

It is a further object of the present invention to employ a gravity loading technique which eliminates backlash in at least two of the aforementioned directions.

It is still a further object of this invention to facilitate actuation of the foregoing positioning apparatus in a simple and straightforward manner utilizing simple mechanical components operable to achieve movements in three directions.

The foregoing and other objects, advantages, and characterizing features of the present invention will become clearly apparent from the ensuing detailed description of an illustrated embodiment thereof, taken together with the accompanying drawing wherein like reference numerals denote like parts throughout the various views.

SUMMARY OF THE INVENTION

An apparatus is provided for precisely adjusting the position of an article relative to a beam emerging from a neutron source disposed in a housing. The apparatus includes a support pivotably mounted on a movable base plate and freely suspended therefrom. The support is gravity biased toward the housing and carries an article holder movable in a first direction longitudinally of the axis of said beam and normally urged into engagement against said housing. Means are provided for moving the base plate in two directions to effect movement of the suspended holder in two mutually perpendicular directions, respectively, normal to the axis of the beam.

DESCRIPTION OF THE PREFERRED EMBODIMENT

Figure 1:
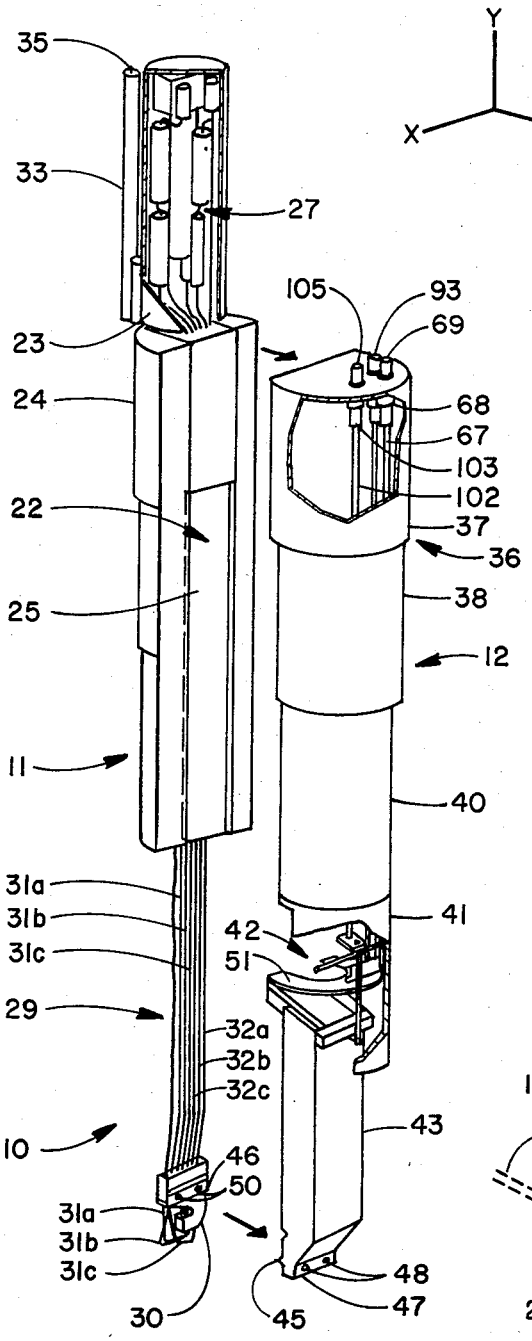
FIG. 1 is a perspective view of a test stalk and shield plug shown prior to assembly and embodying the novel positioning apparatus of this invention.
Figure 2:
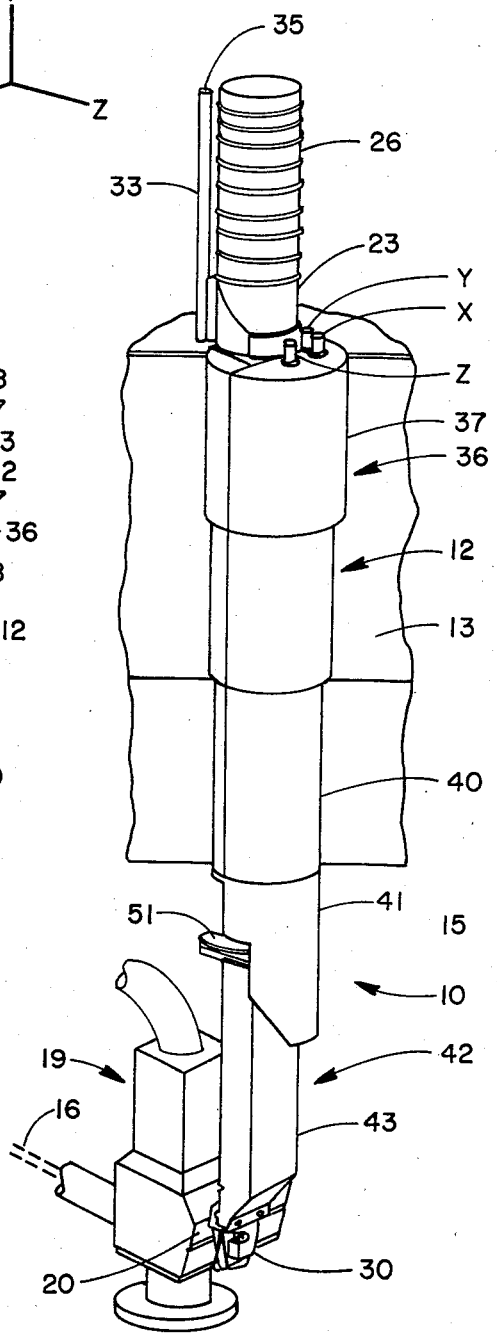
FIG. 2 is a perspective view showing the test stalk and shield plug in an assembled relation to form a test assembly, shown installed within a test cell.

Referring now in detail to the illustrative embodiment depicted in the accompanying drawings, there is shown in FIGS. 1 and 2 a test assembly, designated in its entirety by reference numeral 10 and embodying the novel features of this invention for precisely positioning test specimens in an optimum neutron flux path. The test assembly 10 includes a test stalk 11 and a shield plug 12 (FIG. 1) fitted together to form the test assembly 10 (FIG. 2) shown installed and mounted in the thickly shielded top wall 13 of a test cell 15, wherein an accelerated deuteron-lithium stripping reaction occurs to generate a high energy neutron source. The test stalk 11 and shield plug 12 have complementary, abutting faces that fit flush against each other in the assembled relation and are secured together by suitable fasteners (not shown).

Figure 3:
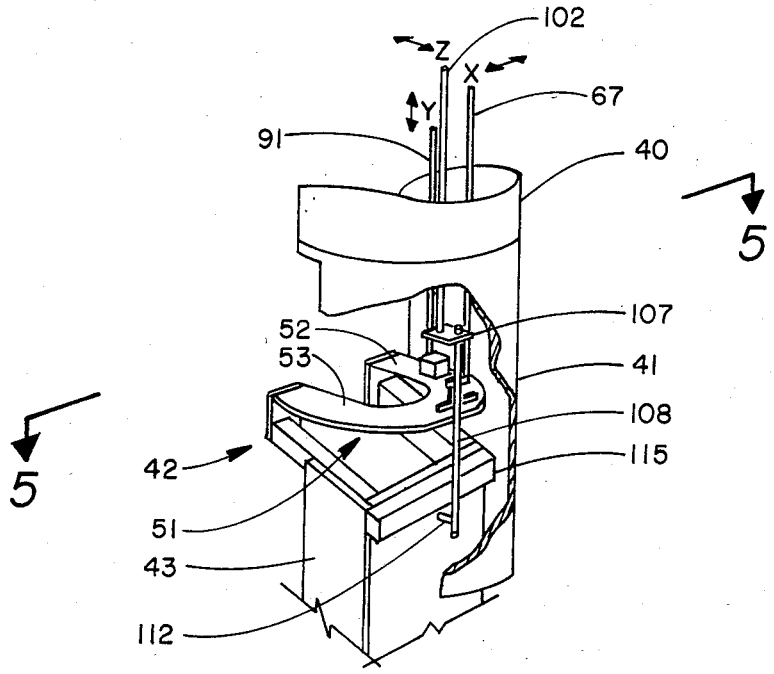
FIG. 3 is an enlarged, fragmentary, schematic view of the mechanical control assembly for effecting movements of the article in various directions.
Figure 4:
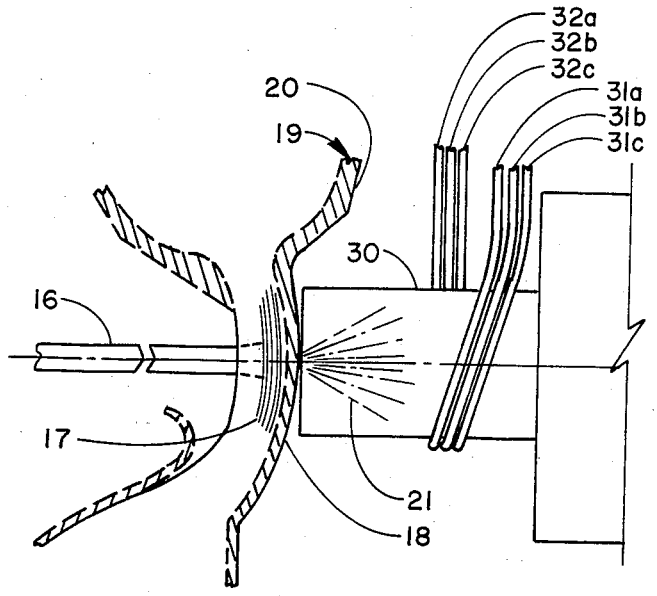
FIG. 4 is an enlarged side elevational view of the article support or holder relative to the axis of a neutron beam.

As earlier noted, a fusion materials irradiation test facility is being developed to create a neutron environment typical of a fusion reactor for the purpose of testing candidate fusion materials and gaining an understanding of their behavior in such an environment. Basically, the facility includes an accelerator (not shown) for producing a continuous wave deuteron beam 16 which is focused onto a flowing lithium target 17 (FIG. 4) guided through a specially configurated nozzle 18 mounted within a suitable housing 19 and located beneath a projection 20 forming a part of the housing 19. The interaction of 35 MeV deuterons with a molten lithium target yields two neutron-producing reactions; namely, a stripping reaction and a compound nucleus reaction. The compound nucleus reactions produce neutrons isotropically while the stripping reaction produces predominantly forward-directed neutrons i.e., neutrons emerging away from but in the direction of and parallel to the deuteron beam. The stripping reaction is dominant and thus, the majority of neutrons or maximum neutron flux produced in the target emerge in the forward direction as shown at 21 in FIG. 3. The test specimens preferably are located adjacent to the target in the path of this maximum neutron flux flow for optimum irradiation. For purposes of this description, this maximum or optimum neutron flux flow will hereinafter be referred to as "neutron beam" 21.

The test stalk 11 of assembly 10 is the vehicle for supporting the materials test specimens in the high energy irradiation environment and includes a cooling system for controlling the temperature of specimens in the presence of neutron and associated prompt gamma heat deposition. The test stalk 11 includes a housing 22 comprised of an upper cylindrical portion or shroud 23, an intermediate partial cylindrical segment 24 and a lower partial cylindrical segment 25. The upper portion 23, which is located above the test cell 15 is a compartment referred to as a "service cell", is surrounded by a cooling coil 26 (FIG. 2) and houses a thermal control system, generally designated 27, comprising various components such as an electromagnetic pump, a heat exchanger, a heater and the necessary connections therebetween.

Extending downwardly from the thermal control system 27 is a conduit or piping system 29 for circulating a liquid metal coolant, preferably sodium potassium (NaK), through an article holder referred to as a "test module" 30 mounted at the lower end of the piping system 29. Preferably, the module 30 is divided into three chambers, each of which contains numerous test specimens adapted to be irradiated. Three of the conduits constitute supply lines 31*a*, 31*b*, and 31*c* connected to passages extending through the chambers, respectively, of the module 30 while the other three conduits 32*a*, 32*b*, and 32*c* form return lines leading from the module chambers to the thermal control system 27.

A suitable, elongated tubular conduit 33, substantially coextensive with the housing upper portion 23, is provided for the passage of electrical leads or connectors 35 therethrough for connecting suitable instrumentation from the test module 30 to manned areas (not shown) outside the service cell.

The shield plug 12 comprises an elongated housing 36 having an upper partial cylindrical segment 37, an intermediate partial cylindrical segment 38, and a lower cylindrical portion 40, all adapted to be fixedly and sealably mounted within the shielded top wall 13. A lower extension 41, partially broken away, projects downwardly from housing portion 40 and serves as both a shroud and a support for the positioning apparatus, generally designated 42.

The positioning apparatus 42, constructed in accordance with this invention, includes a supporting frame 43 adapted to carry the specimen holder or module 30 and is suspended from a portion of the positioning apparatus 42 for movement in various directions as will hereinafter be described in detail. The lower end of the frame 43 is formed with a transversely extending rib 45 adapted to be mated with a complementary transverse recess 46 formed in the module 30 when the test stalk 11 is fitted to the shield plug 12. An abutment member 47 at the lower end of frame 43 is formed with laterally spaced openings 48 aligned with spaced openings 50 in module 30 for receiving suitable fasteners (not shown) therethrough for rigidly securing the module 30 to the supporting frame 43. Thus, the module 30 is mounted on the frame 43 for selective movement therewith into a desired position relative to the neutron beam 21. The conduits forming the piping system 29 are sufficiently flexible to accommodate the small movements imparted to module 30 via the supporting frame 43. Preferably, the conduits are formed of a suitable material capable of withstanding high pressures and the high temperatures encountered in an irradiation environment.

Figure 5:
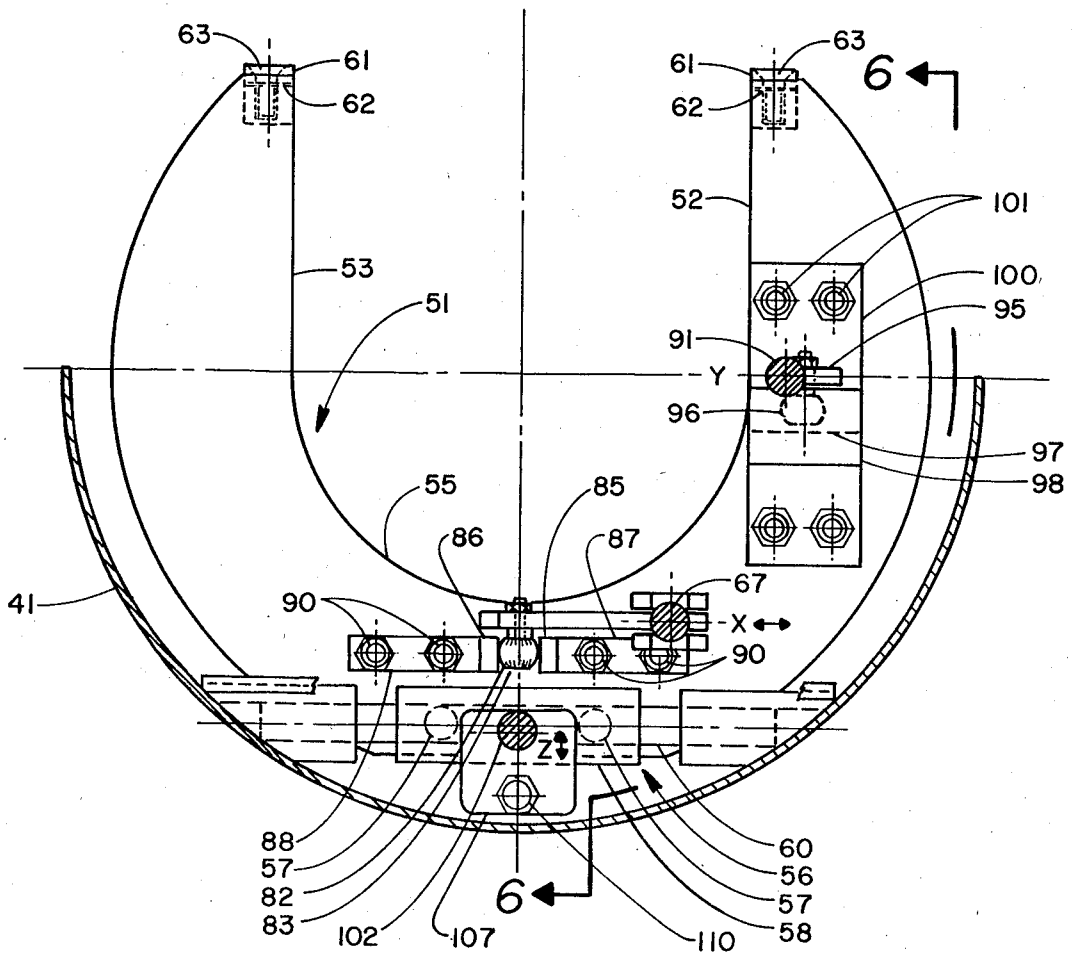
FIG. 5 is a horizontal sectional view, on an enlarged scale, taken along line 5—5 of FIG. 3.
Figure 6:
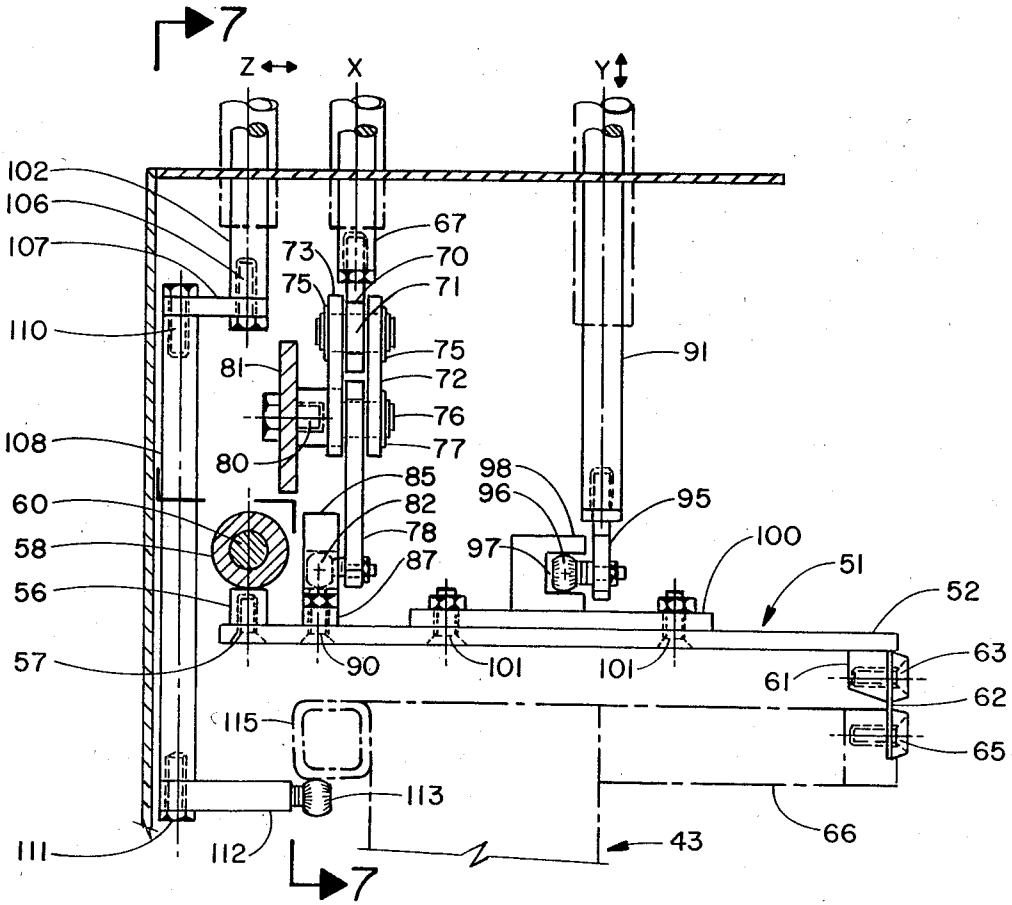
FIG. 6 is a vertical sectional view, taken along line 6—6 of FIG. 5.

The positioning apparatus 42 includes a pivotal base member or plate 51 having a generally U-shaped configuration in plan (FIG. 5) comprised of a pair of spaced legs 52 and 53 connected together by a web portion 55. As best shown in FIGS. 5 and 6, a bearing block 56 is mounted on the upper surface of web portion 55, as by screws 57 for example, and is provided with a bearing sleeve 58 welded thereon for receiving a pivot pin 60 rigidly mounted at its opposite ends in extension 41. Lugs 61 are welded or otherwise fixedly secured to the other side of plate 51 adjacent the free ends of legs 52 and 53, respectively, for mounting thin metallic hinge strips 62 thereto by suitable fasteners 63. The lower portions of hinge strips 62 are connected, as by fasteners 65, to a bracket 66 forming a part of the supporting frame 43. These hinge strips 62 are formed of a suitable metal which is relatively rigid but sufficiently flexible to serve as a hinge, permitting swinging or pivoting movement of the supporting frame 43 in a single arcuate path relative to base plate 51 about a generally horizontal axis. Thus, the supporting frame 43 is supported solely by the hinge strips 62 and, due to its center of gravity, is biased in a counterclockwise direction as viewed in FIG. 6 about strips 62 into engagement at its lower end with the housing 19 in the region of neutron beam 21.

The positioning apparatus 42 of this invention is capable of precisely controlling or finely adjusting the position of the module 30 and thereby the test specimens relative to the neutron beam 21. To this end, apparatus 42 includes means for moving the module 30 in a horizontally lateral or X direction relative to and perpendicular to the neutron beam 21. Such means comprises an elongated, vertically extending control rod 67 provided at the upper end thereof with a lead screw-nut arrangement 68 (FIG. 2) having a drive portion 69 projecting upwardly through the housing 36 for connection to and rotation by suitable remotely located drive means to effect vertical reciprocal movement of the rod 67. Of course, drive portion 69 can be manipulated manually by hand or an appropriate hand tool, if desired.

The lower end of rod 67 is provided with a fitting 70 (FIGS. 6 and 7) for connection to a pin 71 mounted adjacent its opposite ends in the upper portion of a pair of laterally spaced links 72 and 73 (FIG. 6) held in place on the pin 71 by retainer rings 75. The lower ends of the links 72 and 73 are connected to a pin 76 and secured in place thereon by retainer rings 77. One end of a bell crank 78 is connected to pin 76 between the links 72 and 73 and is mounted for pivotal movement about a pivot pin 80 secured to a bracket 81 connected to the frame of extension 41. The other end of bell crank 78 is provided with an actuator in the form of a roller 82 having rounded edges and which is captively held in a key way or slot 83 formed by the spacing between the opposed upright legs 85 and 86 of a pair of angle members 87 and 88 secured, as by fasteners 90, to the base plate 51.

Figure 7:
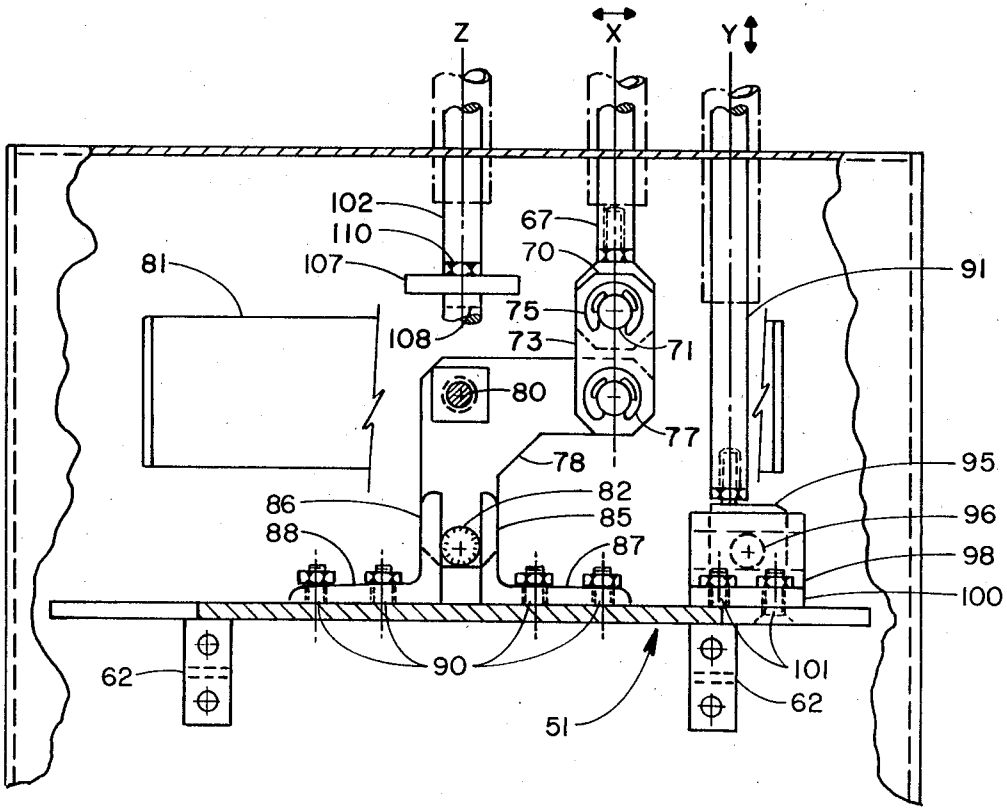
FIG. 7 is a vertical sectional view, taken along line 7—7 of FIG. 6.

With the above arrangement, it will be observed that lowering of control rod 67 by rotation of the drive portion 69 in the proper direction causes the bell crank 78 to pivot about pin 80 in a clockwise direction as viewed in FIG. 7 to shift the cam roll 82 toward the left against the abutment defined by leg 86 of angle member 88. This moves the base plate 51 in the same direction and carries therewith the connected supporting frame 43 horizontally leftwardly to effect corresponding lateral movement of the module 30 in a similar horizontal transverse direction along the X axis. Of course, raising the control rod 67 effects translation of the module 30 in the opposite lateral transverse direction along the X axis. Thus, fine adjustment of the module 30 transversely relative to the neutron beam 21 is accomplished by actuation of the control rod 67 in the appropriate vertical direction.

The positioning apparatus 42 also is provided with means operative to move the module 30 in a vertical or Y direction relative to the axis of the neutron beam 21. To this end, such means include an elongated, vertically extending control rod 91 also provided at its upper end with a lead screw-nut assembly (not shown) having a drive portion 93 protruding upwardly through the housing 36 for connection to a suitable direct or remotely located drive control to effect vertical reciprocal movement of the rod 91. The lower end of rod 91 is provided with a fitting 95 threaded axially into the end of rod 91 and carrying a roller 96 disposed in a horizontal slot 97 formed in a guide block 98 welded or otherwise fixedly secured to a mounting plate 100 affixed to the base plate 51 by fasteners 101. Thus, vertical displacement of the control rod 91 effects raising or lowering of the base plate 51 about pin 60 carrying along therewith the supporting frame 43 to, in turn, shift the module 30 vertically or in a Y direction relative to the neutron beam 21. The pivotal movement of the base plate 51 about pin 60 is translated, via hinge strips 62, into vertical movement of the frame 43 and module 30, which is normally biased against the target housing 19 as will hereinafter be described.

Referring to FIG. 7, it will be seen that the slot 83 allows the base plate 51 to be raised or lowered without displacing roller 82 or otherwise disturbing the linkage imparting horizontal movement to base plate 51. Likewise, the slot 97 provides horizontal play between the latter and roller 96 to accommodate movement of the base plate 51 in a horizontal direction upon actuation of control rod 67 without displacing the roller 96 or otherwise affecting the linkage imparting vertical movement to base plate 51. Thus, movements in either the X or Y directions are completely independent of each other whereby movement in either direction does not influence movement of the base plate 51 in the other direction.

Means also are provided for moving the module 30 in a third direction toward and away from target 17. Although the travel of module 30 in this direction follows a slight arcuate path about a relatively large radius, such slight arcuate movement will be identified as movement in a Z direction for purposes of this description since the travel for all practical purposes is substantially parallel to the neutron beam 21.

The means for imparting movement of module 30 in this Z direction includes an elongated, vertically extending control rod 102 provided at its upper end with a lead screw-nut assembly 103 (FIG. 1) having a drive portion 105 thereof extending upwardly through the housing 36 for connection to a suitable drive train to impart vertical reciprocal movement to the rod 102.

The lower end of control rod 102 is attached by fastener 106 to a horizontally extending link 107, in turn connected to the upper end of a connecting rod 108 by a fastener 110. The lower end of connecting rod 108 is secured, as by a fastener 111, to a support 112 provided with an actuator in the form of a roller 113. The roller 113 is adapted to engage an abutment member 115 rigidly attached to the upper end of supporting frame 43. The roller 113 is normally disposed beneath the member 115 in spaced relation thereto so that the supporting frame 43 is freely suspended from hinge strips 62 and counterweighted by gravity for urging the module 30 attached thereto into engagement with housing 19 adjacent target 17. When desired to displace the module 30 away from the housing 20, control rod 102 is raised by proper manipulation of the drive portion 105 to effect lifting, via connecting rods 102 and 108, of roller 113 into engagement with abutment member 115 to pivot the supporting frame 43 in a clockwise direction (FIG. 6) about the hinge strips 62. Movement of module 30 in the Z direction can be actuated independently of the X and Y movements. While such Z movement has no effect on the X position of the module, it will result in a slight displacement of the module in the Y direction which can be readily corrected, if necessary. Once the module is freely suspended for engagement by gravity against the housing, it can be independently moved in either the X or Y direction without affecting the other.

In use, the test stalk 11 and shield plug 12 are assembled and fitted together in the so-called "service cell", which is a large, shielded area or compartment directly above the test cell 15 for housing the support equipment employed for the insertion, removal, assembly, disassembly, and maintenance of test assemblies 10. The test assembly 10 is adapted to be lowered vertically as a unit through a suitable port formed in the top wall 13 of test cell 15 with the upper drive portions 69, 93 and 105 of the three control rods 67, 91 and 102 projecting thereabove into the service cell for selective manual control or connection to a suitable drive train operatively controlled from a remote station (not shown).

Before the assembly 10 is lowered into the test cell 15, the roller 113 is urged, via control rod 102, against abutment member 115 to dispose the lower portion of supporting frame 43 and module 30 rearwardly in a position clearing the projection 20 of housing 19 as the module descends therepast. Moreover, this maintains the supporting frame 43 in a stable, non-swinging position as it is being lowered. When fully lowered, the drive portion 105 is rotated in the proper direction via lead screw-nut assembly 103 to slowly lower the control rod 102 and the associated roller 113, allowing the supporting frame 43 to swing by gravity about hinge strips 62 for gingerly easing the module 30 into engagement against the housing 19. Upon engagement of the module 30 with housing 19, the roller 113 is further lowered to provide a clearance between the latter and abutment member 115, permitting the module to rest freely against the housing.

Once the test assembly 10 has been inserted into test cell 15 with module 30 resting against the housing 19, the module 30 must be aligned with the anticipated path of the neutron beam expected to emerge from the target 17. This anticipated path can be predetermined by known methods and, in most instances, will be centered on the center line of the deuteron beam 16. The alignment of the module 30 is effected by actuating control rods 67 and/or 91 independently to move the module 30 in the corresponding X and/or Y directions, respectively, as required. Once the module 30 is properly aligned with the anticipated path of the forwardly-biased neutron beam, the accelerator can be energized to generate the deuteron-beam 16, a condition referred to as "beam-on".

During beam-on, only little, if any, further positioning adjustment of the module 30 will be required as long as the deuteron-beam remains stable to within approximately $\pm 1$ mm. With beam-on, the location of the axis of the forwardly biased, high density, neutron beam 21 relative to the module can be determined by proper instrumentation mounted on the test assembly 10 or by neutron heating data generated within the test assembly 10. If during beam-on, the module 30 becomes slightly misaligned relative to the neutron beam 21, as may be occasioned by slight shifting of the latter, thermal expansion or improper installation alignment, either or both of the control rods 67 and 91 can be actuated to effect corresponding correctional movements of module 30 in the proper X and Y directions to precisely position the same within the optimum neutron flux of beam 21. When desired to remove the test assembly 10 from test cell 15, control rod 102 is raised to lift roller 113 into engagement with member 115 to withdraw the module 30 away from the housing 19 sufficiently to clear projection 20 and thereby permit smooth and easy vertical retraction of the test assembly 10 upwardly from test cell 15 without interference or obstruction by the projection 20.

While it has been convenient to describe the positioning apparatus of this invention preferably in connection with the positioning of test specimens relative to the neutron flux path of a neutron source, it should be understood that the apparatus of this invention is not restricted thereto, but has utility in any application where it is desired to precisely or finely adjust by remote means in inaccessible locations the position of articles in three directions relative to an axis or target zone.

From the foregoing, it is apparent that the objects of the present invention have been fully accomplished. As a result of the present invention, a new and useful positioning apparatus is provided for precisely orienting test specimens within the optimum neutron flux flow path of a forwardly biased neutron source. The positioning apparatus incorporates simple mechanical components for imparting independent motion in three substantially perpendicular directions, namely the X, Y and generally Z directions. The range of motion in these three directions compensates and corrects for any misalignment occurring between the test specimens and the optimum neutron flux flow path resulting from thermal expansion differences and fabrication tolerances therebetween. The apparatus provides accurate positioning predicated on gravity loading which eliminates all backlash in the Y and Z directions. Moreover, the gravity counter weighting also eliminates the need for springs in an irradiation environment. Also, the pivotal hinge strip arrangement provides for retraction of the test module 30 from underneath the housing projection to allow for unobstructed vertical insertion and removal of the test assembly 10 into and from the test cell. Moreover, the gravity loading in the Z direction allows the test module 30 to slide over the target housing in the event such module is inadvertently raised without prior Z direction retraction.

It is to be understood that the form of the invention herein shown and described is to be taken as an illustrative embodiment only of the same, and that various changes in the shape, size and arrangement of parts may be resorted to without departing from the spirit of the invention.

We claim:

1. An apparatus for precisely adjusting the position of an article relative to a beam emerging from a housing comprising: a frame, a base plate mounted on said frame for movement relative thereto, a support, means pivotably mounting said support adjacent one end thereof on said base plate, an article holder detachably mounted on the other end of said pivotable support, said support being freely suspended from said base plate and normally biased by gravity toward said housing for urging said holder in a first direction substantially parallel to said beam against said housing, means on said frame for shifting said base plate to effect movement of said holder in a second direction perpendicular to said beam axis, and means on said frame for pivoting said base plate to effect movement of said holder in a third direction substantially normal to said first and second directions.

2. An apparatus according to claim 1, including means for moving said support and holder away from said housing.

3. An apparatus according to claim 2, wherein said moving means comprises an actuator engagable with said support for moving said support in a direction opposite said gravity biased direction.

4. An apparatus according to claim 3, wherein said moving means includes a reciprocal control rod operatively connected to said actuator for selectively urging said actuator into engagement and disengagement with said support.

5. An apparatus according to claim 1, wherein said shifting means and said pivoting means are independently operable to effect movement of said holder in the associated direction irrespective of the position to which said holder has been moved in the other direction.

6. An apparatus according to claim 2 wherein said base plate and pivotal support are mounted in an irradiation test cell and said shifting means, pivoting means, and moving means are provided with separate actuating means extending to the exterior of said test cell.

7. An apparatus according to claim 1, wherein said shifting means comprises a reciprocal control rod connected at one end thereof to a bell crank for transmitting vertical motion into horizontal motion, said bell crank having an actuator disposed in a vertical slotted guideway mounted on said base plate for displacing said base plate horizontally upon actuation of said control rod.

8. An apparatus according to claim 1, wherein said pivoting means comprises a vertically reciprocal control rod having one end connected to an actuator disposed in a horizontal slotted guideway mounted on said base plate for pivoting said base plate upon actuation of said control rod.

9. An apparatus according to claim 1, wherein said pivotal mounting means comprises a pair of hinge strips connecting said support to said base plate.

* * * * *